United States Patent [19]
Kejha

[11] Patent Number: 5,705,084
[45] Date of Patent: Jan. 6, 1998

[54] POLYMER ALLOY ELECTROLYTES FOR ELECTROCHEMICAL DEVICES

[76] Inventor: Joseph B. Kejha, 5115 Campus Dr., Plymouth Meeting, Pa. 19462

[21] Appl. No.: 791,854

[22] Filed: Jan. 31, 1997

[51] Int. Cl.$^6$ .................. H01G 9/025; H01M 6/18
[52] U.S. Cl. ............ 252/62.2; 429/192; 429/190; 361/525; 361/526
[58] Field of Search ............. 252/62.2; 429/192, 429/190, 33; 361/525, 526

[56] References Cited

U.S. PATENT DOCUMENTS

| | | | |
|---|---|---|---|
| 5,011,751 | 4/1991 | Yoneyama et al. | 429/192 |
| 5,296,318 | 3/1994 | Gozdz et al. | 429/192 |
| 5,418,091 | 5/1995 | Gozdz et al. | 429/254 |
| 5,631,103 | 5/1997 | Eschbach et al. | 429/190 |

FOREIGN PATENT DOCUMENTS 8-165395  6/1996  Japan.

*Primary Examiner*—Alan Diamond
*Attorney, Agent, or Firm*—Zachary T. Wobensmith, III

[57] ABSTRACT

Solid state polymer alloy electrolytes for electrochemical devices which contain mixtures of polyethylene oxide and polyvinyldienefluoride, or polyethylene oxide and polyvinyldienefluoride/hexafluoropropylene with aprotic solvents and salts, in which solidification occurs by cooling and full or partial evaporation of one solvent, which electrolytes are also useful for construction of electrodes.

3 Claims, No Drawings

5,705,084

POLYMER ALLOY ELECTROLYTES FOR ELECTROCHEMICAL DEVICES

BACKGROUND OF THE INVENTION

1. Field of the Invention

Composite solid state polymer alloy electrolytes for alkali metal or alkaline earth metal batteries, and other electrochemical devices, which contain polyethylene oxide and polyvinyldienefluoride or polyethylene oxide and polyvinyldienefluoride/hexafluoropropylene with aprotic liquids and salts, and may be dissolved in a solvent, the mixture is coated onto an electrode and solidified by full or partial solvent evaporation, and which may also be used for electrode construction.

2. Description of the Prior Art

In the prior art, various polymers have been used as a component of the electrolytes of solid state alkali and alkaline earth metal batteries, and various other kinds of electrochemical devices.

Among the problems associated with many polymers is that they have inherent relatively low ionic conductivity, and may react with the component materials, which may be an alkali metal such as lithium, or carbon, or other anodes to form a non-conductive boundary layer, or which have a crystalline structure that prevents the free flow of ions, and hinders rechargeability.

The prior art polymer-containing electrolytes may also exhibit poor adherence to the electrodes, do not react well to compressive forces which can cause shorting of the battery, may lack sufficient electrochemical and temperature stability, require long times for curing, or require complex processing.

It is also desirable to have an electrolyte that is useful for construction of electrodes.

The U.S. Patent to Hope, et al., U.S. Pat. No. 5,006,431 describes a solid state polymer electrolyte for batteries, where the electrolyte is formed by mixing an ultraviolet light or electron beam curable polymer with an electrolyte, and curing the mixture by exposure to ultraviolet light or electron beam radiation, whereby the polymer cross links and forms the electrolyte.

The U.S. patent to Henry Hope, et al, U.S. Pat. No. 5,102,752 describes a solid state composite electrolyte which includes an electrically insulating porous, fibrous structure which has been saturated with an ion conductive, sold state matrix, and cross-linked by an alkaline metal triflate salt, or by the alkaline metal triflate salt and a radiation curable polymer.

The U.S. patent to Joseph Kejha U.S. Pat. No. 5,529,707 describes lightweight composite polymeric electrolytes for electrochemical devices which contain a lightweight inorganic filler, such as oxides of lithium, magnesium, and sodium and which are formed by complexing an alkaline metal triflate salt, polyethylene oxide and fillers with at least one ester, and an ether, or a plurality of ethers or esters of different boiling points as co-solvents to form an electrolyte.

The U.S. patent to Godz, et al, U.S. Pat. No. 5,296,318 describes a rechargeable battery with lithium intercalation compound electrodes, and an interposed electrolyte of flexible polymer containing a lithium salt dissolved in a polymer compatible solvent. This patent uses PVDF/HFP copolymer based polymer electrolyte, which has considerably reduced ionic conductivity.

The U.S. patent to Godz, et al, U.S. Pat. No. 5,418,091 describes a flexible polymeric film separator for electrolytic devices. This patent requires a complex multiple step process, to obtain high ionic conductivity, and if the PVDF/HFP is used alone without the complex process, then the ionic conductivity is considerably reduced.

The U.S. patent to Godz, et al, U.S. Pat. No. 5,460,904 describes a lithium-ion polymer laminated rechargeable battery cell which is first plasticized and devoid of electrolyte solution and salts. Later, the plasticizer is extracted by leaching with a solvent and is replaced with a lithium salt electrolyte by soaking, which requires complex processing.

The polymer alloy electrolyte of the invention provides a thin, tough adhesive layer on an electrode which is solidified by cooling and solvent evaporation, prevents shorting, is highly ion conductive, and possesses many other advantages.

SUMMARY OF THE INVENTION

It has now been found that solid or semi-solid state polymer alloy electrolytes for electro chemical devices which are highly ion conductive, flexible but tough enough to resist compressive forces, can be made by compounding polyethylene oxide and polyvinyldienefluoride or polyethylene oxide and polyvinyldienefluoride/hexafluoropropylene with aprotic liquids and salts to form mixtures which are dissolved by heating in a solvent, such as tetrahydrofuran and then cooled to room temperature. The electrolytes are coated cold onto the electrode and solidified by evaporation of the solvent. The electrolyte may then be soaked with an aprotic liquid such as dimethyl carbonate (DMC) which does not dissolve it, and further improves its ionic conductivity.

It has also been found that solid or semi-solid state polymer alloy electrolytes for electrochemical devices, which are highly ion conductive, flexible but tough enough to resist compressive forces, can be made by heating and compounding polyethylene oxide and polyvinyldienefluoride or polyethylene oxide and polyvinyldienefluoride/hexafluoropropylene with aprotic solvents and salts to form mixtures which are coated hot onto the electrode, and solidified by cooling and partial evaporation of the solvent. An important part of this invention is the discovery that PVDF or PVDF/HFP are compatible with PEO and can be alloys. The PEO has also been found to increase the ionic conductivity of the alloy.

The principal object of the invention is to provide a solid state polymer alloy electrolyte for electrochemical devices which contain mixtures of polyethylene oxide and polyvinyldienefluoride or polyethylene oxide and polyvivyldienefluoride/hexafluoropropylene, and which is highly ion conductive.

A further object of the invention is to provide an electrolyte of the character aforesaid that provides a thin, tough layer with excellent adherence to electrodes.

A further object of the invention is to provide an electrolyte of the character aforesaid, that is flexible, tough and resistant to compressive forces, resists shorting and is easy to handle and produce.

A further object of the invention is to provide an electrolyte of the character aforesaid which is coated cold onto the electrode and, solidified by evaporation of a solvent.

A further object of the invention is to provide an electrolyte of the character aforesaid, which is coated hot onto the electrode, and solidified by cooling and partial solvent evaporation.

A further object of the invention is to provide an electrolyte of the character aforesaid that is rapidly processed.

A further object of the invention is to provide an electrolyte of the character aforesaid which is useful in construction of electrodes.

Other objects and advantageous features of the invention will be apparent from the description and claims.

DESCRIPTION OF THE PREFERRED EMBODIMENTS

Alkali metal based electrochemical devices such as batteries, capacitors, fuel cells, and for example lithium ion polymer batteries, consist of at least an anode layer, a polymer electrolyte layer, and a cathode layer. Such batteries can be of virtually any desired size and configuration, and usually include additional layers such as current conducting backing layers, insulating layers and electrode connection layers.

The polymer dielectric or electrolyte layer must be compatible with the component materials used to fabricate the batteries while possessing suitable ionic conductivity.

The preferred polymer electrolyte is an alloy of PVDF and PEO, or PVDF/HFP and PEO, containing at least one aprotic liquid and at least one salt.

Aprotic liquids may be esters like ethylene carbonate, propylene carbonate, dimethyl carbonate, butylene carbonate, diethyl carbonate, methyl-ethyl carbonate or other esters, or ethers like dimethoxyethane, tetrahydrofuran, dimethoxypropane, or other ethers, or mixtures of these liquids. The salts may preferably be alkali metal salts, such as lithium triflate, lithium perchlorate, lithium hexafluorophosphate, lithium hexafluorarsenate, lithium tetrafluorborate, or other salts, or mixtures thereof.

Preferred embodiments of the alloy polymer electrolyte of the invention for alkali-metal ion polymer batteries and other alkali metal electrochemical devices are illustrated in the following examples, and were preferably made in a dry inert atmosphere from dried and anhydrous materials.

EXAMPLE I

A sample of a polymer alloy electrolyte for electrochemical devices was formed by compounding the following which contained:

1. 56 g THF (tetrahydrofuran)
2. 6.5 g DMC (dimethyl carbonate)
3. 3.29 EC (ethylene carbonate)
4. 1.29 lithium triflate
5. 0.5 g PVDF (polyvinyldienefluoride) (homopolymer)
6. 1.2 g PEO (polyethylene oxide)

The mixture was heated to 60° C. during mixing with a magnetic stirrer in a closed bottle to dissolve the PVDF and PEO, it was then cooled to room temperature and remained in a liquid state.

The liquid was then coated onto an electrode by dipping the electrode therein, but which could be coated thereon by the doctor blade technique, or by extrusion coating.

After coating the THF solvent substantially evaporated, which resulted in a tough ionically conductive film layer, which was soaked with an aprotic liquid such as DMC which does not dissolve it and which further improves its ionic conductivity.

EXAMPLE II

Another sample of a polymer alloy electrolyte for electrochemical devices was formed by compounding the following which contained:

1. 56 g THF (tetrahydrofuran)
2. 6.5 g DMC (dimethyl carbonate)
3. 3.2 g EC (ethylene carbonate)
4. 1.2 g lithium triflate
5. 0.5 g PVDF/HFP (polyvinyldienefluoride/hexafluoropropylene Copolymer)
6. 1.2 g PEO (polyethylene oxide)

The mixture was heated to 60° C. during mixing with a magnetic stirrer in a closed bottle to dissolve the PVDF/HFP and PEO, it was then cooled to room temperature and remained in a liquid state.

The liquid was coated onto an electrode by dipping the electrode therein. After coating the THF solvent substantially evaporated, which resulted in a tough, ionically conductive film layer, which was soaked with an aprotic liquid such as DMC which does not dissolve it, and which further improved its ionic conductivity.

EXAMPLE III

Another sample of a polymer alloy electrolyte for electrochemical devices was formed by compounding the following:

1. 27 g DMC (dimethyl carbonate)
2. 13 g EC (ethylene carbonate)
3. 5 g lithium perchlorate
4. 6.5 g PVDF (polyvinyldienefluoride) (Homopolymer)
5. 1.0 g PEO (polyethylene oxide)

The mixture was heated to 90° C. during mixing with a magnetic stirrer in a closed bottle to dissolve the PVDF and PEO, and then coated hot onto an oxide based electrode, which contained the same electrolyte as a binder.

After cooling to 27° C. and partial evaporation of the DMC, a second similarly constructed, but lithiated carbon based electrode was added.

The resultant cell was sealed in a moisture proof bag, produced 3.8 volts, and was rechargeable.

EXAMPLE IV

Another sample of a polymer alloy electrolyte for electrochemical devices was formed by compounding the following:

1. 27 g DMC (dimethyl carbonate)
2. 13 g EC (ethylene carbonate)
3. 5 g lithium perchlorate
4. 6.5 g PVDF/HFP (polyvinyldienefluoride-hexafluoropropylene copolymer)
5. 1.0 g PEO (polyethylene oxide)

The mixture was heated to 90° C. during mixing with a magnetic stirrer in a closed bottle to dissolve the PVDF and PEO, and then coated hot onto an oxide based electrode, which contained the same electrolyte as a binder.

After cooling to 27° C. and partial evaporation of the DMC, a second similarly constructed but lithiated carbon based electrode was added.

The resultant cell was sealed in a moisture proof bag, produced 3.8 volts, and was rechargeable.

It should be noted that the lithium perchlorate salt in Examples III and IV can be replaced as required by lithium triflate, ($LiPF_6$), ($LiBF_4$) or ($LiASF_6$) or their mixtures, including lithium perchlorate, and the DMC can be replaced by diethyl-carbonate (DEC), ethyl-methyl carbonate (EMC) or other ethers; or by THF, dimethyoxyethane (DME) or other desired ethers or their mixtures thereof of the same % weight.

It has been observed that the use of PEO in the alloy electrolyte examples improves the flexibility of the electrolyte and makes it more ionically conductive.

The electrolytes may be combined with a fibrous woven or non-woven, or expanded film net or mesh to provide a composite electrolyte as described in the U.S. patent to Hope U.S. Pat. No. 5,102,752 or the U.S. patent to Kejha U.S. Pat. No. 5,521,023, or may be combined with ceramic fillers as described in the U.S. Patent to Kejha U.S. Pat. No. 5,529,707.

The electrolyte may be also made as free-standing films, with or without the net, and then laminated into an electrolytic device assembly as a separator.

When using copolymer PVDF/HFP or homopolymer PVDF, the addition of PEO slows down the solidification, and markedly improves the ionic conductivity, and is now a polymer alloy.

The described electrolytes are especially useful in lithium-ion polymer batteries. The percentage weight ranges for the described examples are as follows:

EXAMPLE I

1. THF determines the thickness of the layer and is varied as required.
2. DMC 0.1% to 90% - - - ]
3. EC 0.1% to 60% - - - ]
4. LITHIUM TRIFLATE 1% to 50%]
5. PVDF 0.1% to 70%]
6. PEO 0.5% to 70% - - - ]
after exclusion of the THF

EXAMPLE II

1. THF determines the thickness of the layer and is varied as required.
2. DMC 0.1% to 90% - - - ]
3. EC 0.1% to 60% - - - ]
4. LITHIUM TRIFLATE 1% to 50%]
5. PVDF/HFP 0.1% to 70%]
6. PEO 0.5% to 70%]
after exclusion of the THF

EXAMPLE III

1. DMC 0.1% to 90%
2. EC 0.1% to 60%
3. LITHIUM PERCHLORATE 1% to 50%
4. PVDF 0.1% to 70%
5. PEO 0.5% to 70%

EXAMPLE IV

1. DMC 0.1% to 90%
2. EC 0.1% to 60%
3. LITHIUM PERCHLORATE 1% to 50%
4. PVDF/HFP 0.5% to 70%
5. PEO 0.5% to 70%

For other alkali metal or alkaline earth metal batteries, the lithium triflate, lithium perchlorate, and other described salts should be replaced by triflate, perchlorate and other salts matching the selected alkali or alkaline earth metal, and having the same % weight range.

It should of course be understood that the description is merely illustrative and that various modifications and changes can be made in the disclosed polymer alloy electrolytes without departing from the spirit of the invention.

It is thus apparent that the objects of the invention have been achieved.

I claim:

1. A composite solid state or semi-solid state polymer alloy electrolyte for batteries, capacitors and other electrochemical devices, wherein the electrolyte mixture contains polyethylene oxide, polyvinyldienefluoride/hexafluoropropylene, an alkali metal or alkaline earth metal salt and at least one aprotic liquid.

2. A composite solid state or semi-solid polymer alloy electrolyte for batteries, capacitors and other electrochemical devices wherein the electrolyte contains tetrahydrofuran from a trace amount to the percentage weight of 40%, dimethyl carbonate in the percentage weight range of 0.1% to 90%, ethylene carbonate in the percentage weight range of 0.1% to 60%, lithium triflate in the percentage weight range of 1% to 50%, plyvinyldienefluoride/hexafluoropropylene in the percentage weight range of 0.1% to 70%, and polyethylene oxide in the percentage weight range of 0.5% to 70%.

3. A composite solid state or semi-solid polymer alloy electrolyte for batteries, capacitors and other electrochemical devices wherein the electrolyte contains dimethyl carbonate in the percentage weight range of 0.1% to 90%, ethylene carbonate in the percentage weight range of 0.1% to 60%, lithium perchlorate in the percentage weight range of 1% to 50%, polyvinyldienefluoride/hexafluoropropylene in the percentage weight range of 0.1% to 70%, and polyethylene oxide in the percentage weight range of 0.5% to 70%.

* * * * *